United States Patent
Faraji et al.

(10) Patent No.: US 10,828,986 B2
(45) Date of Patent: Nov. 10, 2020

(54) CABIN AIR FILTER ELEMENT MONITORING AND ANALYSIS SYSTEM AND ASSOCIATED METHODS

(71) Applicant: MANN+HUMMEL GmbH, Ludwigsburg (DE)

(72) Inventors: Shaghayegh Faraji, Cary, NC (US); Andreas Scope, Oberschona (DE); Matthias Heinzmann, Bayreuth (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

(21) Appl. No.: 16/241,962

(22) Filed: Jan. 7, 2019

(65) Prior Publication Data
US 2020/0215915 A1    Jul. 9, 2020

(51) Int. Cl.
| | |
|---|---|
| *B60K 35/00* | (2006.01) |
| *B60Q 5/00* | (2006.01) |
| *B60Q 9/00* | (2006.01) |
| *B60H 3/06* | (2006.01) |
| *B01D 46/00* | (2006.01) |
| *B01D 46/52* | (2006.01) |
| *B01D 46/42* | (2006.01) |
| *G06F 3/14* | (2006.01) |

(52) U.S. Cl.
CPC .......... *B60K 35/00* (2013.01); *B01D 46/0086* (2013.01); *B01D 46/429* (2013.01); *B01D 46/521* (2013.01); *B60H 3/0608* (2013.01); *B60Q 5/005* (2013.01); *B60Q 9/00* (2013.01); *B01D 2279/40* (2013.01); *B60H 2003/0683* (2013.01); *B60K 2370/16* (2019.05); *G06F 3/14* (2013.01)

(58) Field of Classification Search
None
See application file for complete search history.

(56) References Cited

U.S. PATENT DOCUMENTS

| | | | | |
|---|---|---|---|---|
| 5,302,153 | A * | 4/1994 | Winters | B60H 3/0641 454/158 |
| 5,971,287 | A * | 10/1999 | Kettner | B60H 1/00742 165/230 |
| 7,178,410 | B2 * | 2/2007 | Fraden | A47L 9/19 73/861.52 |
| 9,120,366 | B2 * | 9/2015 | Hoke | B60H 3/0616 |
| 9,840,127 | B2 * | 12/2017 | Minamiura | B60H 1/00278 |
| 10,065,143 | B2 | 9/2018 | Beier | |
| 10,179,542 | B1 * | 1/2019 | Salter | B60Q 3/68 |
| 10,363,510 | B1 * | 7/2019 | Karas | B01D 46/0086 |

(Continued)

FOREIGN PATENT DOCUMENTS

| | | |
|---|---|---|
| DE | 102009040707 B4 | 4/2011 |
| DE | 102014015397 A1 | 4/2016 |

*Primary Examiner* — Chico A Foxx
(74) *Attorney, Agent, or Firm* — James Hasselbeck

(57) ABSTRACT

A filter element status analysis and notification system which includes a primary control unit, a filter element which filters cabin air of a vehicle and a sensor module provided on the filter element. The sensor module including a plurality of sensors, which sensors include at least a temperature sensor and a humidity sensor. The control system being operable to detect various filter element parameters and determine potential for microbial growth. The system then providing an alert to the user regarding the determined microbial growth potential.

26 Claims, 10 Drawing Sheets

(56) References Cited

U.S. PATENT DOCUMENTS

| | | | |
|---|---|---|---|
| 2003/0051023 A1* | 3/2003 | Reichel | G01N 33/0075 709/223 |
| 2004/0031248 A1* | 2/2004 | Lindsay | B01D 46/0023 55/385.3 |
| 2004/0141875 A1* | 7/2004 | Doshi | A61L 9/20 422/4 |
| 2005/0057348 A1* | 3/2005 | Hammerschmidt | B60C 23/0408 340/445 |
| 2007/0277592 A1* | 12/2007 | Johansson | B01D 46/0086 73/38 |
| 2008/0102487 A1* | 5/2008 | Yao | G01N 21/31 435/34 |
| 2010/0000190 A1* | 1/2010 | Kidman | B01D 46/0005 55/502 |
| 2010/0305761 A1* | 12/2010 | Remsburg | F24F 11/0008 700/277 |
| 2011/0185895 A1 | 8/2011 | Freen | |
| 2011/0257922 A1* | 10/2011 | Fang | G01N 1/2273 702/100 |
| 2012/0125592 A1* | 5/2012 | Fadell | B01D 46/0086 165/201 |
| 2012/0317938 A1* | 12/2012 | Sullivan | B01D 46/18 55/354 |
| 2013/0132775 A1* | 5/2013 | Onoue | G06Q 10/063 714/33 |
| 2013/0133404 A1* | 5/2013 | Patel | F24F 11/30 73/29.02 |
| 2013/0288585 A1* | 10/2013 | Hoke | B60H 3/0616 454/75 |
| 2015/0161876 A1* | 6/2015 | Castillo | G08B 21/0453 340/539.11 |
| 2015/0260424 A1 | 9/2015 | Fadell et al. | |
| 2015/0330857 A1* | 11/2015 | Henderson | G01L 13/00 702/35 |
| 2015/0337745 A1* | 11/2015 | MacNeille | F02D 41/1401 123/406.48 |
| 2017/0080373 A1* | 3/2017 | Engelhard | B01D 46/429 |
| 2017/0095762 A1* | 4/2017 | Wolowicz | B01D 46/0086 |
| 2017/0217284 A1* | 8/2017 | Ji | B60H 1/00564 |
| 2017/0246486 A1* | 8/2017 | Cazier | A62B 27/00 |
| 2018/0012479 A1 | 1/2018 | Seaton | |
| 2018/0037093 A1* | 2/2018 | Newman | B60H 3/0078 |
| 2018/0041606 A1* | 2/2018 | Luo | G01D 21/00 |
| 2018/0057013 A1* | 3/2018 | Mullett | B60H 1/267 |
| 2018/0120279 A1* | 5/2018 | Yi | G01N 33/0073 |
| 2018/0137615 A1* | 5/2018 | Arzate Aleman | G06T 7/0008 |
| 2018/0334008 A1* | 11/2018 | Ericksen | B60G 17/016 |
| 2019/0038230 A1* | 2/2019 | Kim | A61B 5/18 |
| 2019/0041079 A1* | 2/2019 | Kohn | F24F 3/1603 |
| 2019/0084369 A1* | 3/2019 | Duan | B60H 1/008 |
| 2019/0091738 A1* | 3/2019 | Chen | G01J 1/429 |
| 2019/0212177 A1* | 7/2019 | Passaniti | G01N 29/02 |
| 2019/0275856 A1* | 9/2019 | Cronin | B60H 1/00785 |
| 2019/0332149 A1* | 10/2019 | Shelnutt | G06F 1/3296 |
| 2020/0020514 A1* | 1/2020 | Fanson | G01N 30/7206 |

* cited by examiner

CABIN AIR FILTER ELEMENT MONITORING AND ANALYSIS SYSTEM AND ASSOCIATED METHODS

TECHNICAL FIELD

The present invention relates to a cabin filtration monitoring system for use in a vehicle. In particular, the present invention relates to a filter element monitoring system which can be used so as to provide alerts regarding the various parameters reflective of a status of the filter element, wherein the filter element in turn maintains air quality within a cabin of the vehicle.

BACKGROUND

People spend a significant portion of their lives in vehicles, whether it relates to shipping and transportation professionals, people commuting to work, running errands, etc., during which time inside the vehicle cabin the operators or passengers can be subjected to exposure to various allergens, contaminants, etc. As such, many passenger vehicles are equipped with filter elements which are configured to filter air passing into, or being circulated within, the passenger cabin. It has been of increasing concern with such systems that the filter element can become clogged, contaminated, or become otherwise ineffective at removing contaminants or allergens from the air being breathed by passengers within the cabin. To further complicate the issue, such cabin air filters and associated filter elements can often be located in difficult-to-access locations wherein service can thus be burdensome or alternatively in out-of-sight locations which can compound the issue such that service or replacement intervals are ignored or overlooked.

While conventional filter elements typically have guidelines for when a filter element should be replaced, such as a particular timeline, these guidelines may or may not reflect actual filter element state such as particle load, contaminant existence, microbial growth, or any number of situations which might have an effect on a wide variety of potential operating conditions. One of the intended benefits of the present application is that the systems discussed herein seek to optimize filter element service and replacement intervals, while reducing unnecessary downtime as well as waste in replacing otherwise operational filter elements while reducing user uncertainty regarding filter element states.

SUMMARY OF THE INVENTION

The cabin air filter element monitoring and analysis system and associated methods as contemplated herein seeks to provide a system which monitors the state of a filter element, past exposure events, determines the potential for various conditions which relate to cabin air quality and provide alerts to users or operators regarding whether a cabin air filter needs changing.

In order to achieve the aforementioned and other benefits contemplated herein is a filter element status analysis and notification system, wherein the system can include: a primary control unit having a first wireless communication mechanism, processing circuitry, and a non-transitory computer-readable medium, the non-transitory computer-readable medium containing one or more sets of computer instructions configured to instruct the processing circuitry to perform a plurality of tasks.

A filter element can then be provided which is configured to filter an airstream directed into or circulated within a cabin of a vehicle. The system can then include a sensor module provided about the filter element, wherein the sensor module can include a plurality of sensors, the sensors including at least a temperature sensor and at least one humidity sensor, each of the plurality of sensors configured to collect data regarding one or more associated filter element parameters.

A second wireless communication mechanism can also be included as part of the sensor module, which can then be configured to transmit each of the one or more associated filter parameters to the first communication mechanism of the primary control unit.

In some embodiments, the computer instructions can include instructions for the processing circuitry to: receive the one or more associated filter parameters from the sensor module; retrieve a reference database; compare the one or more associated filter parameters from the sensor module to the reference database, the reference database containing information regarding temperature and humidity values corresponding to the temperature or humidity ranges associated with an increased microbial growth potential; determine whether any of the one or more associated filter parameters fall within a pre-determined alert range within the reference database; generate an alert when any of the one or more associated filter parameters fall within the pre-determined alert range, the pre-determined alert range relating to at least temperature and humidity levels corresponding to the ranges corresponding with increased mold growth potential; and broadcast the alert to a user of the vehicle.

In some embodiments, the system can also include a secondary control unit, the secondary control unit further including a display, the display being configured to display the alert.

In some embodiments, the primary control unit can be operatively connected to the secondary control unit utilizing wireless communication, and wherein the secondary control unit can be configured to act as an intermediary and being configured so as to receive the associated filter parameters and forward the associated filter parameters to the primary control unit. In some such embodiments, the secondary control unit can be a smart device, wherein the smart device can include a first wireless communication system, the first wireless communication system providing network connectivity between the smart device and the primary control unit, and wherein the secondary control unit can also include a secondary wireless communication system, the second wireless communication system including short-range wireless connectivity, such as Bluetooth™ connectivity, and wherein the second wireless communication mechanism of the sensor module can also include Bluetooth™ connectivity, wherein the secondary control unit and the sensor module communicate utilizing Bluetooth™ connectivity.

In some embodiments, the sensor module can include a local non-transitory computer-readable medium, wherein the sensor module can be configured to take a plurality of sensor measurements relating to the one or more associated filter parameters for each of the plurality of sensors, and wherein the sensor module can record the one or more sensor measurements and an associated measurement time and records each of the one or more sensor measurements on the local non-transitory computer-readable medium.

In some embodiments, the sensor module can also include, a housing, wherein the housing includes a channel, the channel being configured to extend from the housing being located on an inlet side of the filter element, the channel extending through the filter element to an outlet side of the filter element. In some such embodiments the sensor module can then also include a plurality of pressure sensors, a first pressure sensor being configured to read an ambient pressure on the inlet side of the filter element, a second pressure sensor being configured to read an outlet pressure on the outlet side of the filter element through the channel. Or in other words, pressure sensors can be provided on the upstream and downstream sides of the filter element so as to determine a pressure differential across the filter element.

In some embodiments, the one or more sets of computer instructions can also include instructions for the processing circuitry to: generate a historical report showing the one or more associated filter parameters as recorded in a historical database; and display the report to a user of the vehicle.

In some embodiments, the sensor module can include a local non-transitory computer-readable medium and local processing circuitry, wherein the sensor module is configured to take a plurality of sensor measurements relating to the one or more associated filter parameters at intermittent time periods and store the sensor measurements for a delayed and intermittent transmission to the primary control unit. In some such embodiments the sensor measurements can be taken at least sixty second intervals. In some such embodiments the delayed and intermittent transmissions can be configured to occur at intervals being at least sixty seconds apart. Further, in some such embodiments, the sensor module can be instructed to enter a power saving mode between each of the delayed and intermittent transmissions. In some alternative such embodiments, the sensor module can be configured to enter a power saving mode after a plurality of sequential zero differential pressure readings between the first pressure sensor and the second pressure sensor, wherein in power saving mode the sensor module is configured to take sensor readings at intervals being longer than sixty seconds.

In some alternative embodiments, the primary control unit can be provided as a smart device, the smart device including a first wireless communication system, the first wireless communication system providing network connectivity so as to allow the smart device to retrieve the reference database from a network location, the smart device also including a second wireless communication system, the second wireless communication system including Bluetooth™ connectivity, and wherein the second wireless communication mechanism of the sensor module also includes Bluetooth™ connectivity, wherein the primary control unit and the sensor module communicate utilizing Bluetooth™ connectivity.

Also contemplated herein is a method of analyzing a filter element status and providing alerts of said status, wherein the method can include the steps of: providing a filter element configured to filter an airstream circulated directed into or recirculated within a cabin of a vehicle; and providing a sensor module about the filter element. In such embodiments the sensor module can include: a plurality of sensors, the sensors including at least a temperature sensor and at least one humidity sensor, each of the plurality of sensors configured to collect data regarding one or more associated filter element parameters; and a local wireless communication mechanism being configured to transmit each of the one or more associated filter parameters.

The method can then include the steps of providing a primary control unit, the primary control unit including a first wireless communication mechanism, processing circuitry, and a non-transitory computer-readable medium, the non-transitory computer-readable medium containing one or more sets of computer instructions.

The method can then include the steps of: receiving the one or more associated filter parameters from the sensor module; retrieving a reference database; comparing the one or more associated filter parameters from the sensor module to the reference database, the reference database containing information regarding temperature and humidity values corresponding to the ranges with increased mold growth potential; determining whether any of the one or more associated filter parameters fall within a pre-determined alert range within the reference database; generating an alert when any of the one or more associated filter parameters fall within the pre-determined alert range, the pre-determined alert range relating to at least temperature and humidity levels corresponding to the ranges corresponding with increased mold growth potential; and broadcasting the alert to a user of the vehicle.

In some embodiments, the method can also include a step of providing a secondary control unit, the secondary control unit further including a display, the display being configured to receive and from the primary control unit and display the alert.

In some embodiments, the primary control unit can be operatively connected to the secondary control unit utilizing wireless communication, and wherein the secondary control unit is configured to act as an intermediary and being configured so as to receive the associated filter parameters and forward the associated filter parameters to the primary control unit.

In some embodiments, the method can include the steps of: generating a historical report showing the one or more associated filter parameters as recorded in a historical database; and displaying the report to a user of the vehicle.

It will also be appreciated that various additional sensors can be incorporated into the sensor module, such sensors can include environmental, or filter state sensors which can be configured to transmit their respective sensed data or signals to the one or more control units.

In yet additional embodiments the one or more control units can include a user input interface, wherein the user input interface can be configured to receive one or more environmental parameters or filter element parameters from a user or operator.

In yet additional embodiments the primary control unit can also include a local non-transitory computer-readable medium configured to store historical data regarding service life information being calculated based on one or more alternative filter elements with similar associated filter element parameters or working conditions correlated to each of the alternative filter elements.

In the various embodiments, sensors can include pressure sensors, accelerometers, flow sensors, strain sensors, humidity sensors, air-mass flow, temperature, particle counter, turbulence sensor, spectrometry, sound, vehicle operation parameters, and optical sensors.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, Bluetooth™, and the like without departing from the scope and intent of the present disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein.

DETAILED DESCRIPTION OF THE INVENTION

It will be appreciated by those having skill in the area of cabin air filtration that service is often done at incorrect intervals due to the inconvenient placement of filter elements and lack of user knowledge regarding operating conditions with regard to the filter element. Failure to change the filter element when necessary can result in reduced fan life, system performance, and decrease in user satisfaction for the vehicle as a whole. In order to provide users or operators with more information regarding cabin filter element status and provide more accurate service timing and requirement information a cabin air filter element monitoring and analysis system and associated methods is contemplated herein. This system and method of monitoring can then provide the user or operator with information so as to aide in scheduling service or making service decisions with regard to the filter element.

Figure 10:
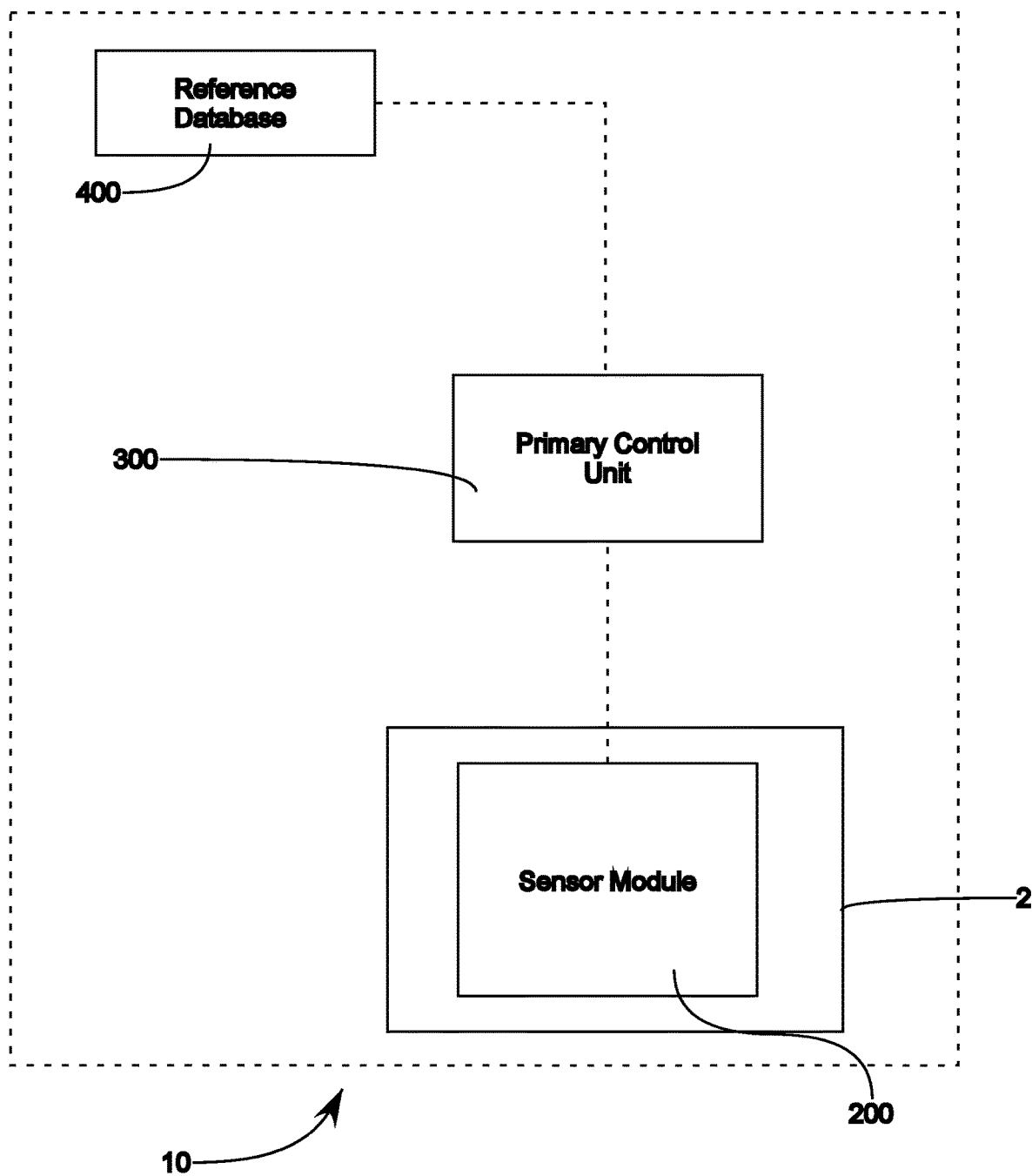
FIG. 10 illustrates an exemplary schematic of a cabin air filter element monitoring and analysis system and associated methods as contemplated herein.
Figure 11:
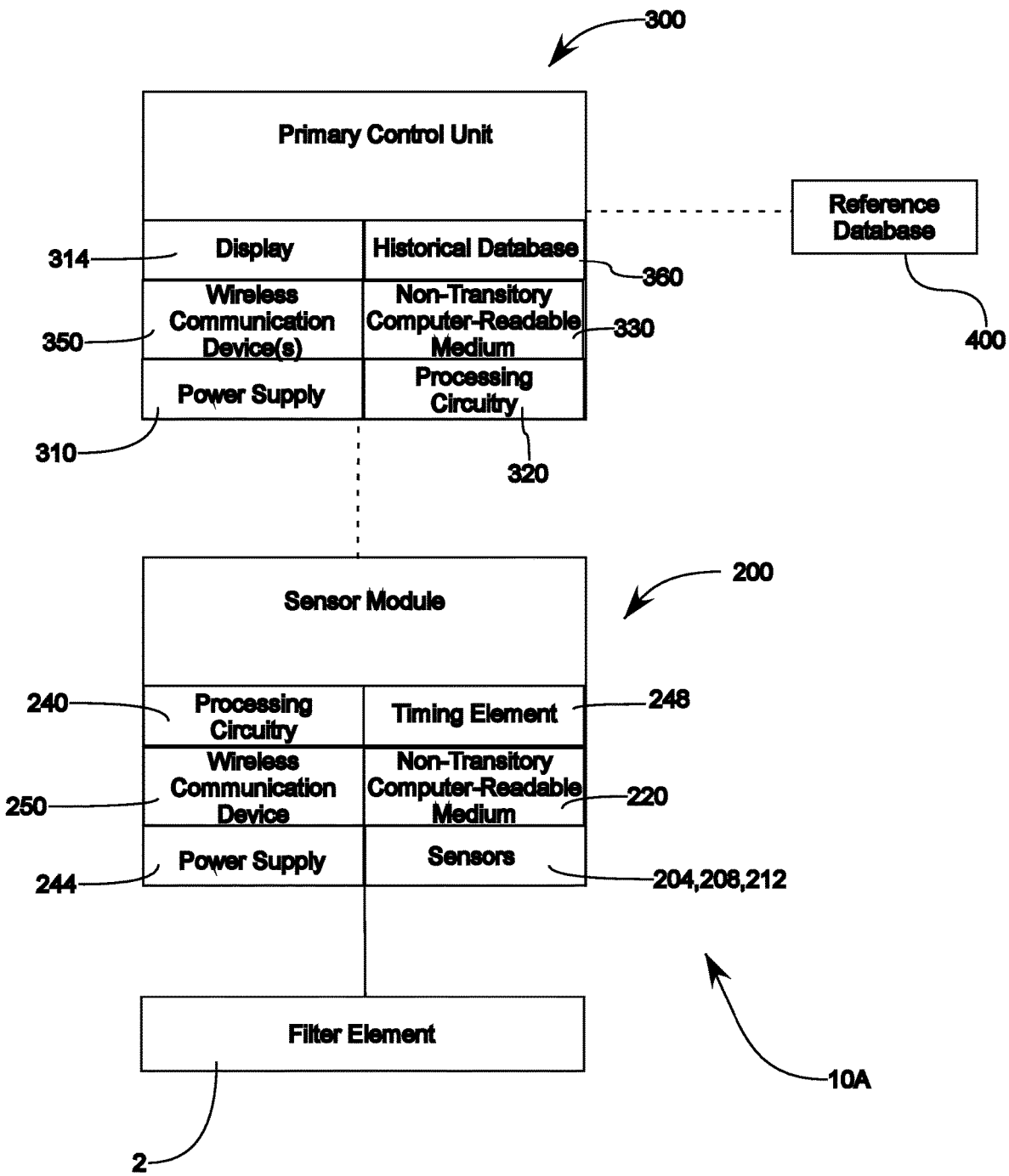
FIG. 11 illustrates a more detailed exemplary schematic of a cabin air filter element monitoring and analysis system and associated methods as contemplated herein.
Figure 12:
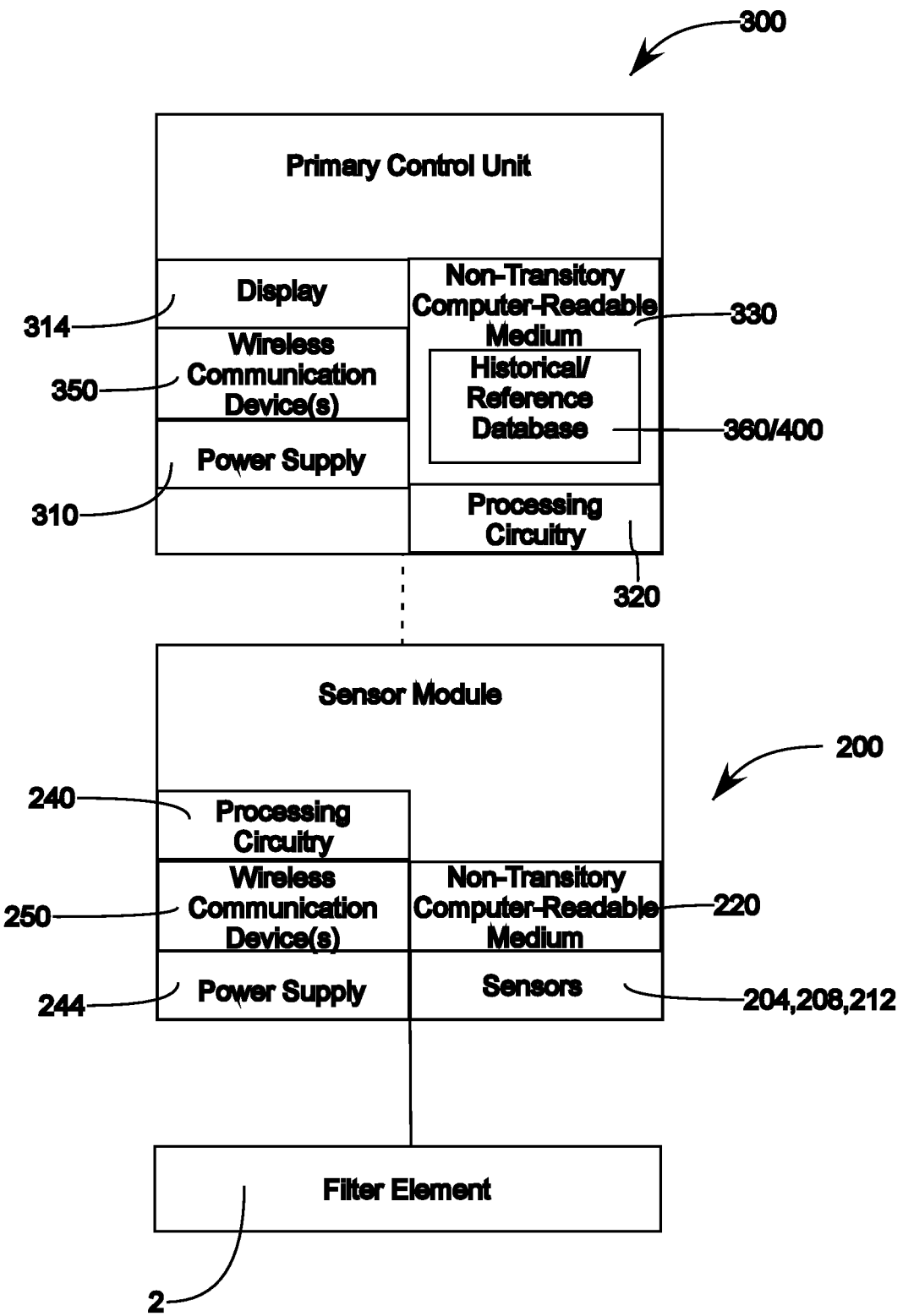
FIG. 12 illustrates an alternative exemplary schematic of a cabin air filter element monitoring and analysis system and associated methods as contemplated herein.
Figure 13:
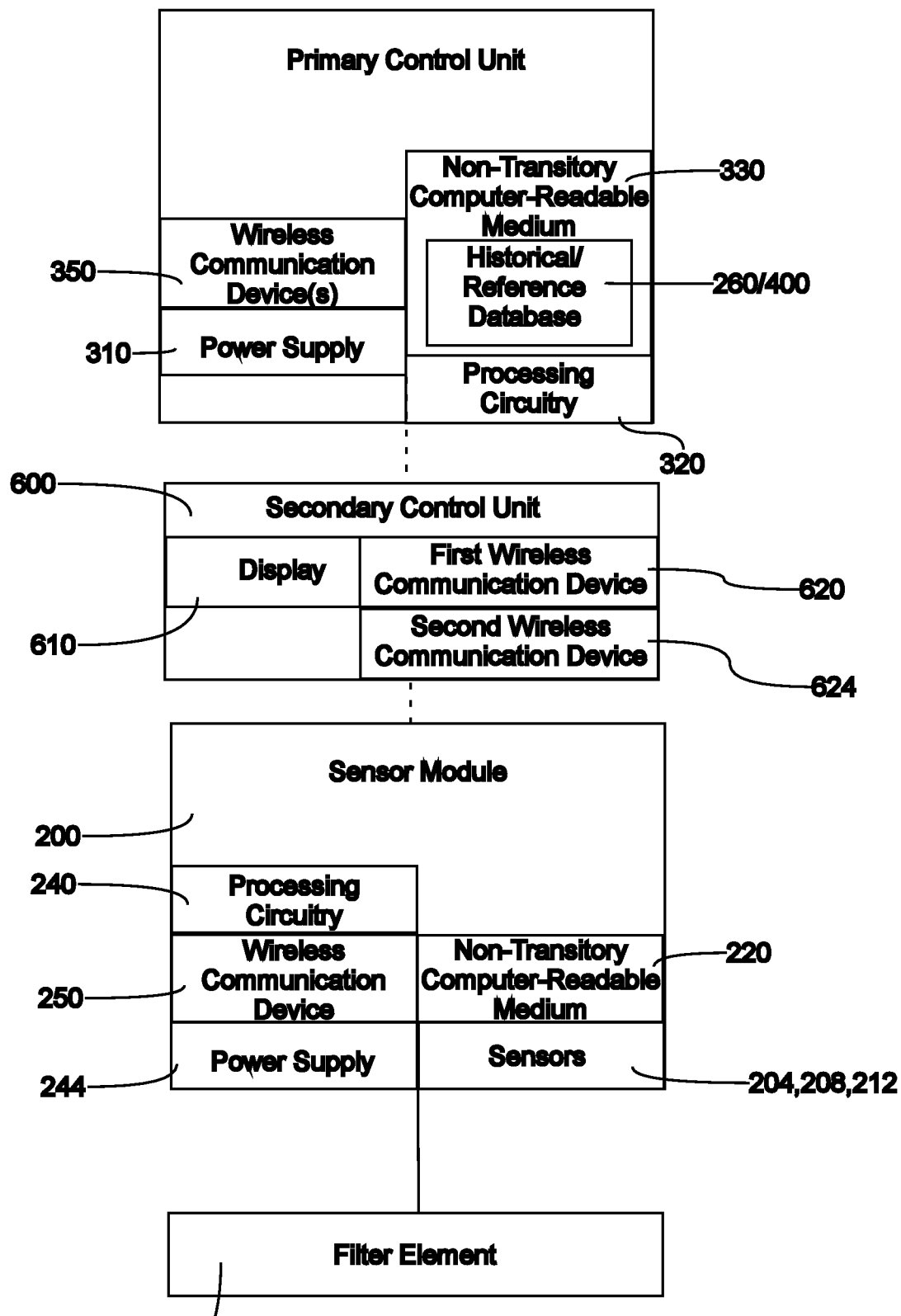
FIG. 13 illustrates yet another alternative exemplary schematic of a cabin air filter element monitoring and analysis system and associated methods as contemplated herein.

Various embodiments of a cabin air filter element monitoring and analysis system 10, as well as 10A-C, as contemplated herein are shown in FIGS. 11-13. Whereas FIGS. 1-8 illustrate various views of a sensor module 200 which can be affixed to a filter element 2, as illustrated particularly in FIG. 8. On a high level, the sensor module 200 can include a plurality of sensors 204, 208, 212, which can be configured to detect a plurality of associated filter parameters and relay those parameters back to a control unit, as depicted in FIGS. 10-12. Based on the sensed filter parameters, the system can make a determination whether there exists a high likelihood microbial growth, for example that fungi or bacteria have grown and have strong known correlations with temperature and humidity levels in which they are likely to grow. As such, a high likelihood can be determined that microbes have grown, or are growing, on or in the filter element. In some instances, the sensor module can also make a determination based on pressure differentials whether the particulate load on the filter element has exceeded a pre-determined threshold, or whether the filter element has blown out, service/usage life, etc. which can each represent a circumstance in which a change or service of the filter element would be preferable or have a high likelihood of being needed.

It will be appreciated that the filter element monitoring system 10 of the present invention will be discussed primarily with regard to cabin air filter elements for purposes of illustration, however, it will be appreciated that other filter elements, such as engine air, oil, or other fluid filter elements, can similarly benefit from various aspects of the present invention. Therefore, aspects of the present invention can be similarly applied to other filtration systems in various environments, including HVAC and other equipment filtration or fluid filtration systems.

FIGS. 10-13 illustrate various exemplary filter element status analysis and notification systems 10, 10A, 10B, and 10C, wherein the system can include: a primary control unit 300 having a first wireless communication mechanism 350, processing circuitry 320, and a non-transitory computer-readable medium 330. In these embodiments the non-transitory computer-readable medium can be provided so with one or more sets of computer instructions provided thereon which can be configured to instruct the processing circuitry to perform a plurality of tasks.

Figure 1:
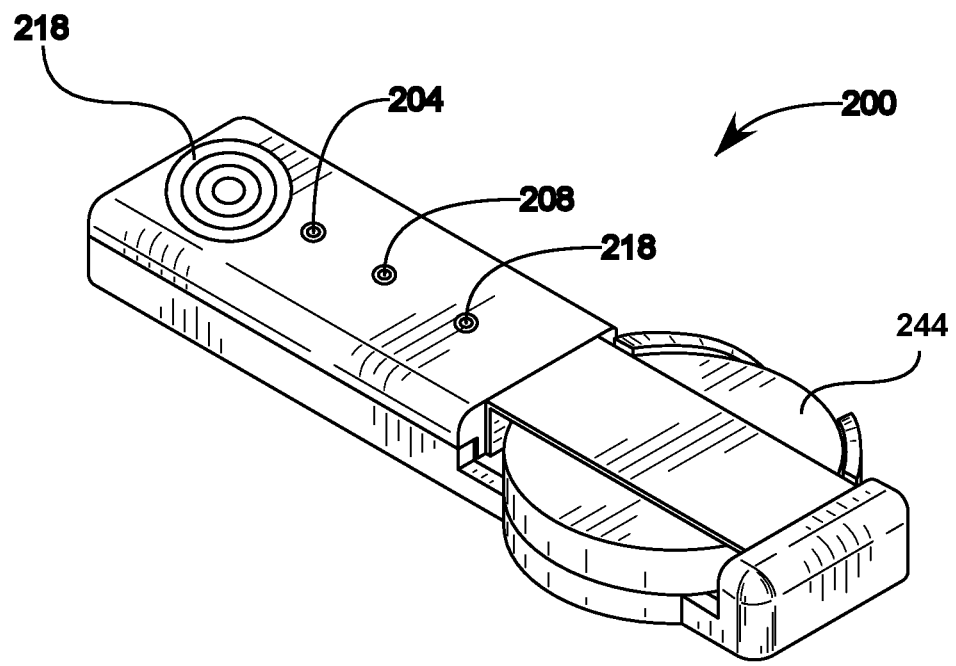
FIG. 1 illustrates an isometric view of an exemplary sensor module for use in a cabin air filter element monitoring and analysis system and associated methods as contemplated herein.
Figure 2:
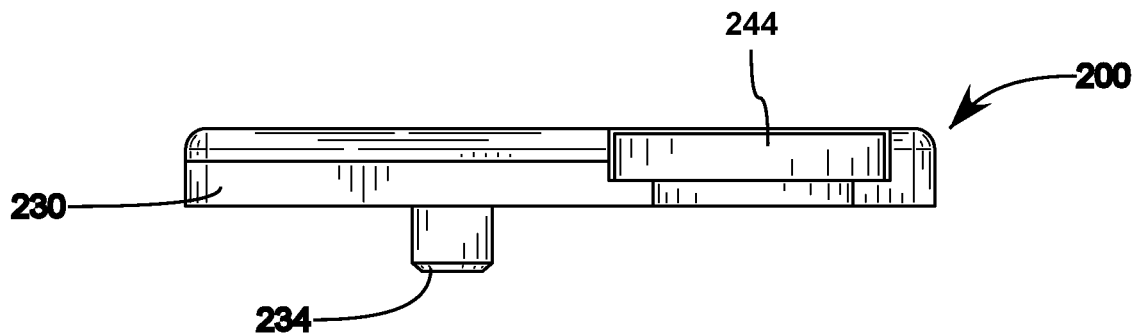
FIG. 2 illustrates a front view of the exemplary sensor module of FIG. 1.
Figure 3:
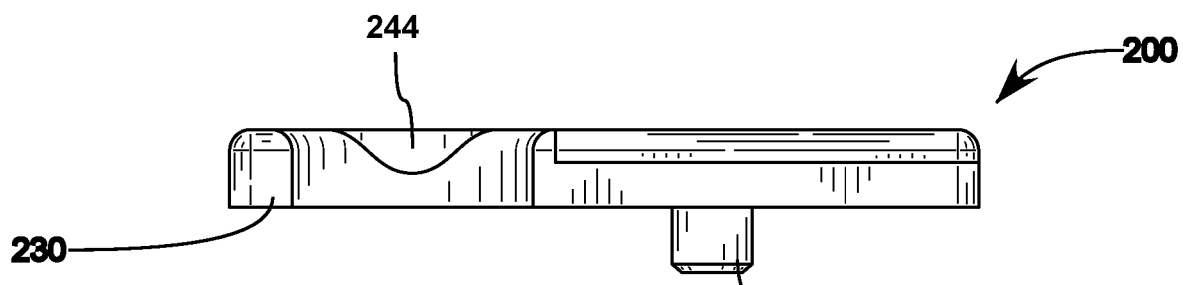
FIG. 3 illustrates a rear view of the exemplary sensor module of FIG. 1.
Figure 4:
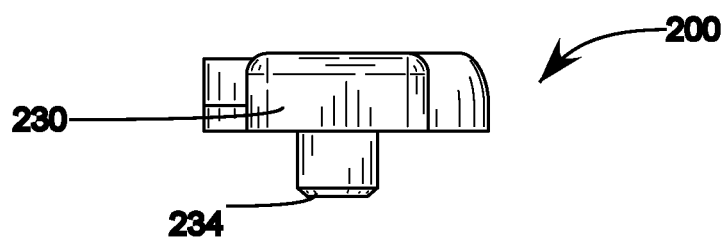
FIG. 4 illustrates a right-side view of the exemplary sensor module of FIG. 1.
Figure 5:
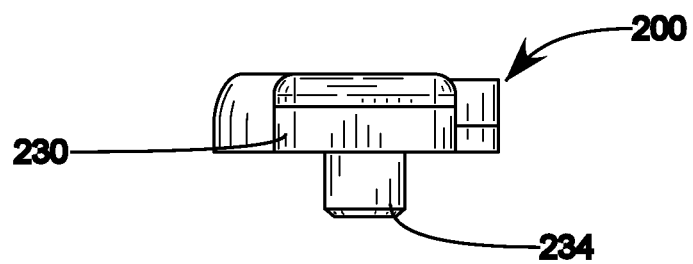
FIG. 5 illustrates a left-side view of the exemplary sensor module of FIG. 1.
Figure 6:
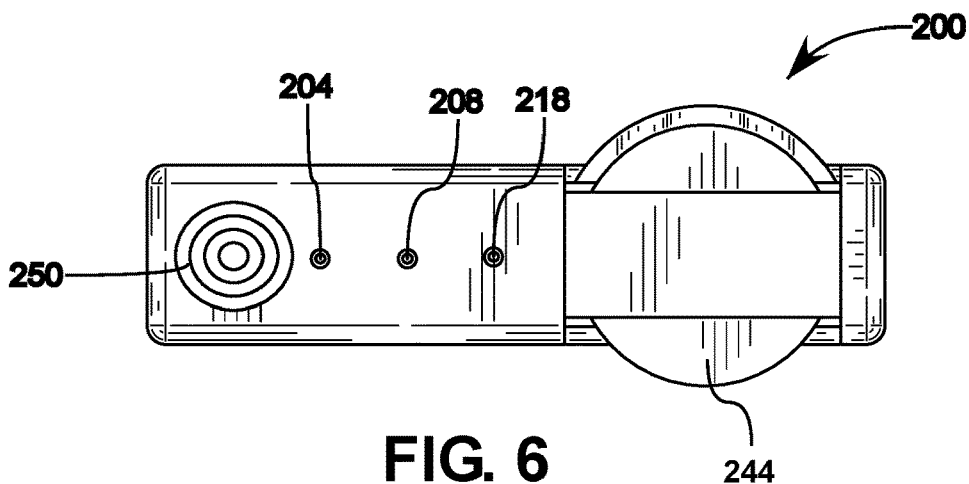
FIG. 6 illustrates a top view of the exemplary sensor module of FIG. 1.
Figure 7:
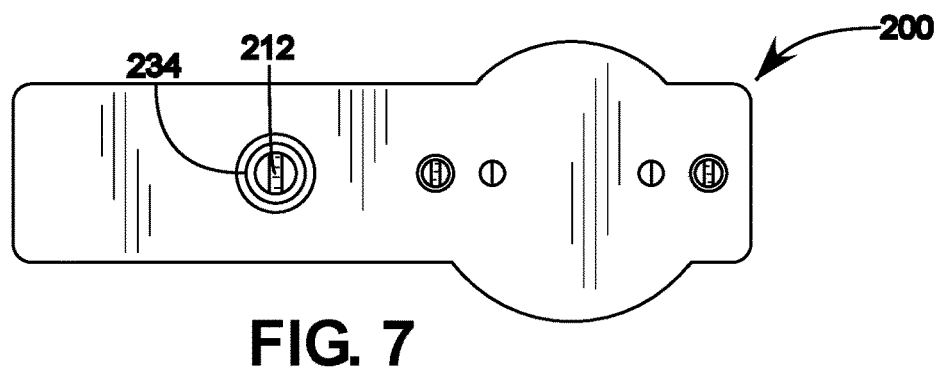
FIG. 7 illustrates a bottom view of the exemplary sensor module of FIG. 1.
Figure 8:
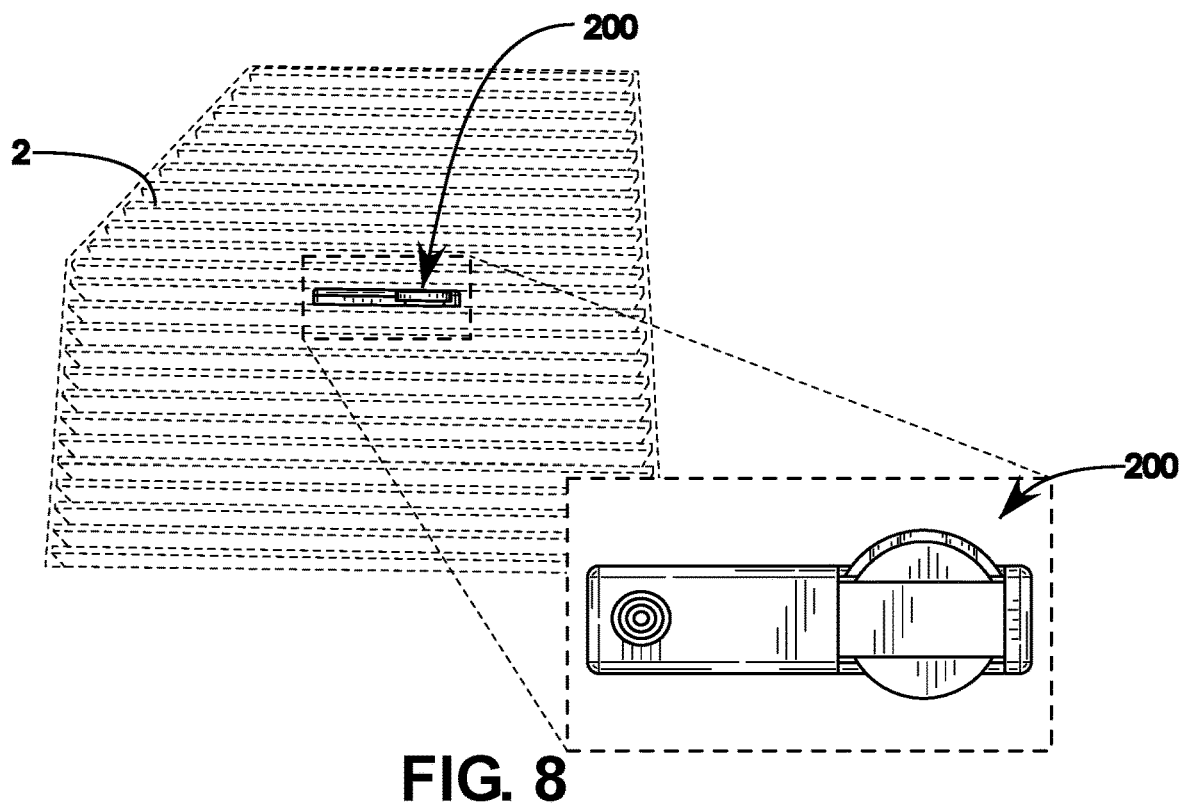
FIG. 8 illustrates a front view of the exemplary sensor module of FIG. 1 as installed into an exemplary filter element.

A filter element 2 can then be provided which is configured to filter an airstream circulated within a cabin of a vehicle. The system can then include a sensor module 200 provided about the filter element 2. In some embodiments the filter element can include a filter media provided having a plurality of pleats, wherein the sensor module be sized accordingly so as to be embedded within the pleats thereof without protruding therefrom, as illustrated in FIG. 8. The sensor module 200 can then include a plurality of sensors, the sensors including at least a temperature sensor 204 and at least one humidity sensor 208, each of the plurality of sensors configured to collect data regarding one or more associated filter element parameters which would indicate a blowout or other failure condition. In particular, these sensors are configured to track humidity levels and temperatures about the filter element 2, and record, transmit, or both, the information back to the primary control unit 300.

A second wireless communication mechanism 250 can also be included as part of the sensor module 200, wherein the second wireless communication mechanism 250 can then be configured to transmit each of the one or more associated filter parameters to the first communication mechanism 350 of the primary control unit 300.

Figure 9:
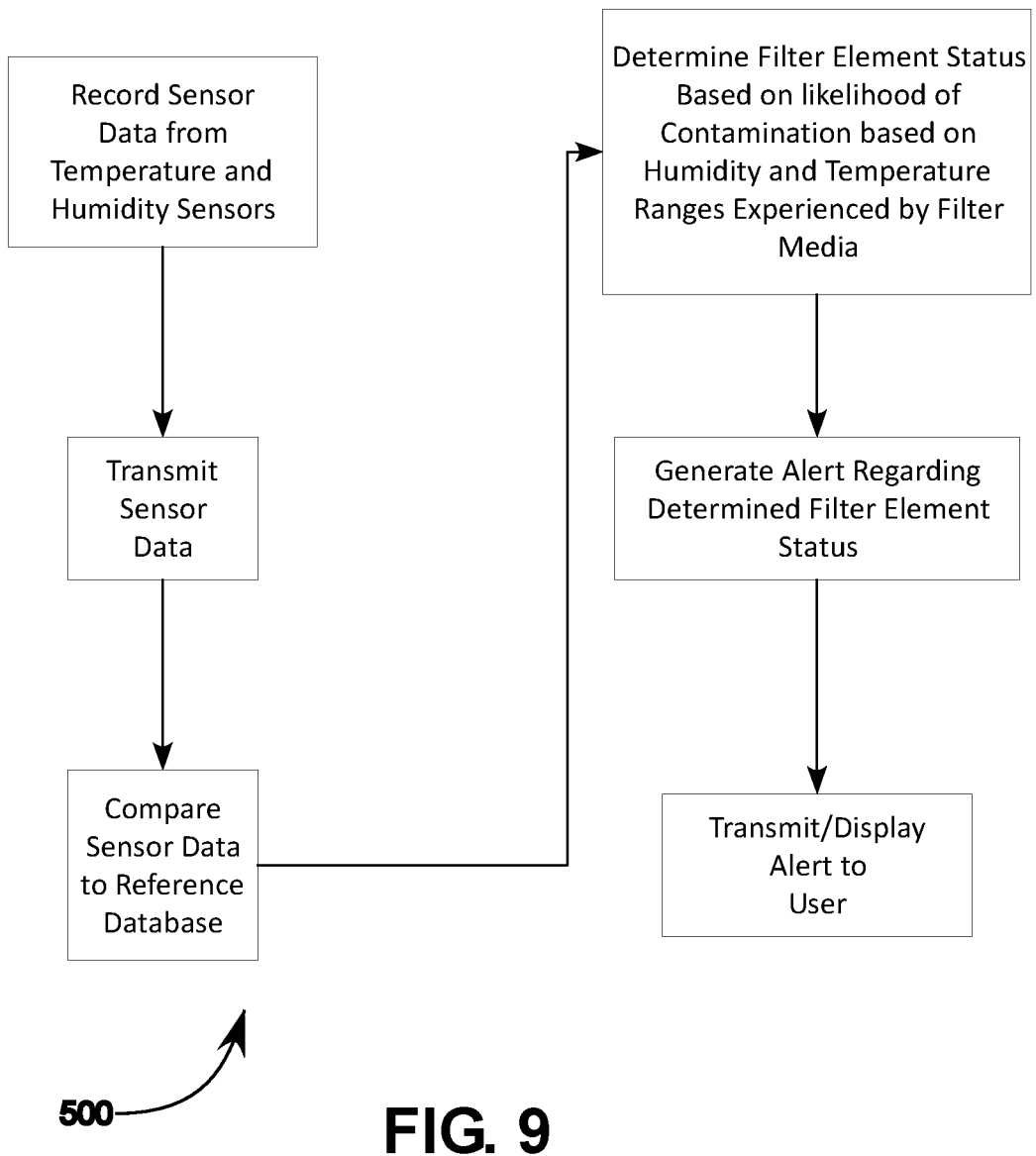
FIG. 9 illustrates an exemplary flow chart of a method of use of a cabin air filter element monitoring and analysis system and associated methods as contemplated herein.

In some embodiments, the computer instructions can include instructions for the processing circuitry to perform a plurality of steps, some of which being illustrated in the method flow chart 500, as illustrated in FIG. 9. The plurality of steps can include the following: receive the one or more associated filter parameters from the sensor module 200; retrieve or access a reference database 400; compare the one or more associated filter parameters from the sensor module to the reference database 400, the reference database 400 containing information regarding temperature and humidity values corresponding to the ranges with increased mold growth potential; determine whether any of the one or more associated filter parameters fall within a pre-determined alert range within the reference database; generate an alert when any of the one or more associated filter parameters fall within the pre-determined alert range, the pre-determined alert range relating to at least temperature and humidity levels corresponding to the ranges corresponding with increased mold growth potential; and broadcast the alert to a user of the vehicle.

In some embodiments, the system can also include a secondary control unit 600. In such embodiments, the secondary control unit 600 can further include a display 610, the display 610 being configured to display the alert to the user. It will be appreciated that the alert can be an indicia, or an audible tone, or both, as appropriate.

In some embodiments, the primary control 300 unit can be operatively connected to the secondary control unit 600 utilizing wireless communication, and wherein the secondary control unit can be configured to act as an intermediary and being configured so as to receive the associated filter parameters and forward the associated filter parameters to the primary control unit 300. In some such embodiments, the secondary control unit 600 can be a smart device, i.e. a smartphone by way of example, wherein the smart device can include a first wireless communication system 620, the first wireless communication system 620 providing network connectivity between the smart device and the primary control unit, and wherein the secondary control unit can also include a secondary wireless communication system 624, the second wireless communication system 624 including Bluetooth™ connectivity, and wherein the second wireless communication mechanism 250 of the sensor module 200 can also include Bluetooth™ connectivity, wherein the secondary control unit 250 and the sensor module communicate utilizing Bluetooth™ connectivity.

In some embodiments, the sensor module 200 can include a local non-transitory computer-readable medium 220, wherein the sensor module 200 can be configured to take a plurality of sensor measurements relating to the one or more associated filter parameters for each of the plurality of sensors, and wherein the sensor module 200 can record the one or more sensor measurements and an associated measurement time and records each of the one or more sensor measurements on the local non-transitory computer-readable medium 220.

It will be appreciated that the sensor module 200 can also include processing circuitry 240 configured to perform the aforementioned tasks and provide instructions regarding transmission of sensor data. The sensor module 200 can then also include a power supply 244 configured to provide the necessary power to the processing circuitry 240, wireless communication device 250, non-transitory computer-readable medium 220, sensors, etc.

In some embodiments, the sensor module 200 can also include, a housing 230, wherein the housing includes a channel 234, the channel 234 being configured to extend from the housing 230 being located on an inlet side of the filter element, the channel 234 being configured to extend through the filter element 2 to an outlet side of the filter element 2. In some such embodiments the sensor module 200 can then also include a plurality of pressure sensors 212 and 218, a first pressure sensor 218 being configured to read an ambient pressure on the inlet side of the filter element, a second pressure sensor 212 being configured to read an outlet pressure on the outlet side of the filter element through the channel 234. Or in other words, the first pressure sensor 218 can be provided on an upstream side of the filter element 2 and the second pressure sensor 212 can be provided on a downstream side of the filter element 2 so as to determine a pressure differential across the filter element 2.

In some embodiments, the one or more sets of computer instructions can also include instructions for the processing circuitry to: generate a historical report showing the one or more associated filter parameters as recorded in a historical database 360; and display the report to a user of the vehicle.

As discussed above, in some embodiments, the sensor module can include a local non-transitory computer-readable medium 220 and local processing circuitry 240. In some such instances, in order to conserve power, the sensor module can be configured to take a plurality of sensor measurements relating to the one or more associated filter parameters at intermittent time periods and store the sensor measurements for a delayed and intermittent transmission to the primary control unit. In some such embodiments, the sensor measurements can be taken at least sixty second intervals. In some such embodiments the delayed and intermittent transmissions can be configured to occur at intervals being at least sixty seconds apart. Further, in some such embodiments, the sensor module can be instructed to enter a power saving mode between each of the delayed and intermittent transmissions. This provides a benefit of not requiring continuous power to the wireless communication device 250 as well as not requiring continuous power to the sensors. In some such instances the sensor module 200 can include a timing element 248 so as to track interval times, times the sensor data was recorded, etc.

In some alternative such embodiments, particularly where the pressure sensors 212 and 218 are provided, the sensor module can be configured to enter a power saving mode after a plurality of sequential zero differential pressure readings between the first pressure sensor 218 and the second pressure sensor 212. In some such embodiments, when in power saving mode the sensor module 200 can be configured to take sensor readings at intervals being longer than sixty seconds, and in some instances only when an operational differential pressure reading is detected.

In some alternative embodiments, and as shown in FIGS. 11 and 12, the primary control unit 300 can be provided as a smart device, the smart device including a first wireless communication system, the first wireless communication system providing network connectivity so as to allow the smart device to retrieve the reference database from a network location, the smart device also including a second wireless communication system, the second wireless communication system including Bluetooth™ connectivity, and wherein the second wireless communication mechanism of the sensor module also includes Bluetooth™ connectivity, wherein the primary control unit and the sensor module communicate utilizing Bluetooth™ connectivity.

It will be appreciated that in some such embodiments the primary control unit can then have an independent power supply 310 and display 314 for powering the various components and independently providing determinations, running the processing circuitry 320 or otherwise powering the display 314 for providing the alert to the user.

In some alternative embodiments the primary control unit 300 can have historical databases 260 or the reference database stored locally on the non-transitory computer-readable-medium. Alternatively the reference database 400 or the historical database 260 can be stored remotely and access utilizing the wireless communication devise provided thereon.

It will be appreciated that the reference databases as contemplated herein can include more than one database associated with a particular sensed data type for any number of associated sensors as contemplated herein. As such, the reference database can include pressure differential information, chemical compositions, particulate loads, particular vapor or gas detection etc. Further, where appropriate, such databases can include additional information correlating ranges of the sensed parameters with an associated increased likelihood of microbial growth, and an associated correlation can thus be determined from each sensed parameter.

Also contemplated herein is a method of analyzing a filter element status and providing alerts of said status, wherein the method can include the steps of: providing a filter element configured to filter an airstream circulated within a cabin of a vehicle; and providing a sensor module about the filter element. In such embodiments the sensor module can include: a plurality of sensors, the sensors including at least a temperature sensor and at least one humidity sensor, each of the plurality of sensors configured to collect data regarding one or more associated filter element parameters; and a local wireless communication mechanism being configured to transmit each of the one or more associated filter parameters.

The method can then include the steps of providing a primary control unit, the primary control unit including a first wireless communication mechanism, processing circuitry, and a non-transitory computer-readable medium, the non-transitory computer-readable medium containing one or more sets of computer instructions.

The method can then include the steps of: receiving the one or more associated filter parameters from the sensor module; retrieving a reference database; comparing the one or more associated filter parameters from the sensor module to the reference database, the reference database containing information regarding temperature and humidity values corresponding to the ranges with increased mold growth potential; determining whether any of the one or more associated filter parameters fall within a pre-determined alert range within the reference database; generating an alert when any of the one or more associated filter parameters fall within the pre-determined alert range, the pre-determined alert range relating to at least temperature and humidity levels corresponding to the ranges corresponding with increased mold growth potential; and broadcasting the alert to a user of the vehicle.

In some embodiments, the method can also include a step of providing a secondary control unit, the secondary control unit further including a display, the display being configured to receive and from the primary control unit and display the alert.

In some embodiments, the primary control unit can be operatively connected to the secondary control unit utilizing wireless communication, and wherein the secondary control unit is configured to act as an intermediary and being configured so as to receive the associated filter parameters and forward the associated filter parameters to the primary control unit.

In some embodiments, the method can include the steps of: generating a historical report showing the one or more associated filter parameters as recorded in a historical database; and displaying the report to a user of the vehicle.

It will also be appreciated that various additional sensors can be incorporated into the sensor module, such sensors can include environmental sensors, or filter state sensors which can be configured to transmit their respective sensed data or signals to the one or more control units. The environmental sensors can include air density, chemical, vapor, gas, turbulators or particulate sensors, etc., each of which can provide information regarding environmental or ambient vehicle or air conditions.

In yet additional embodiments the one or more control units can include a user input interface, wherein the user input interface can be configured to receive one or more environmental parameters or filter element parameters from a user or operator.

In yet additional embodiments the primary control unit can also include a local non-transitory computer-readable medium configured to store historical data regarding service life information being calculated based on one or more alternative filter elements with similar associated filter element parameters or working conditions correlated to each of the alternative filter elements from the reference database.

In some embodiments, the sensor data can be recorded and tabulated wherein daily, weekly, or monthly average values can also be determined, stored, and compared to the reference database. In some embodiments, the reference database can be continuously updated so as to increase accuracy regarding determinations of microbial growth potential. In some embodiments, upon change, the user can be prompted to provide information regarding actual filter status state with regard to microbial growth. Alternatively, users can be prompted to return used filter elements for analyzation and update in the reference database.

In some embodiments, the system can be configured to determine, calculate, and record various data points. For example, the system can determine normal or average operating conditions based on user times, environments, etc., during the a first designated time period. Such base-line values can then be set and stored in non-volatile memory as "Baseline Value". Further, the system can determine, calculate, and record or set a "Mid-Point Value" which can be utilized to determine usage, operation times, wake up the sensor module from sleep mode, etc. The system can then also store this value in its non-volatile memory.

By way of example, setting a "Critical Value": wherein after a baseline value is defined, the device should calculate the critical value: for example, a baseline value+100 Pa. It should also store this value on its associated non-transitory computer-readable medium, i.e. a local or remote non-volatile memory.

By further way of example, setting "Termination Point Value": After baseline value is defined, the device can be configured to calculate the termination point: baseline value+150 Pa. It should also store this value in its non-volatile memory.

Figure 14:
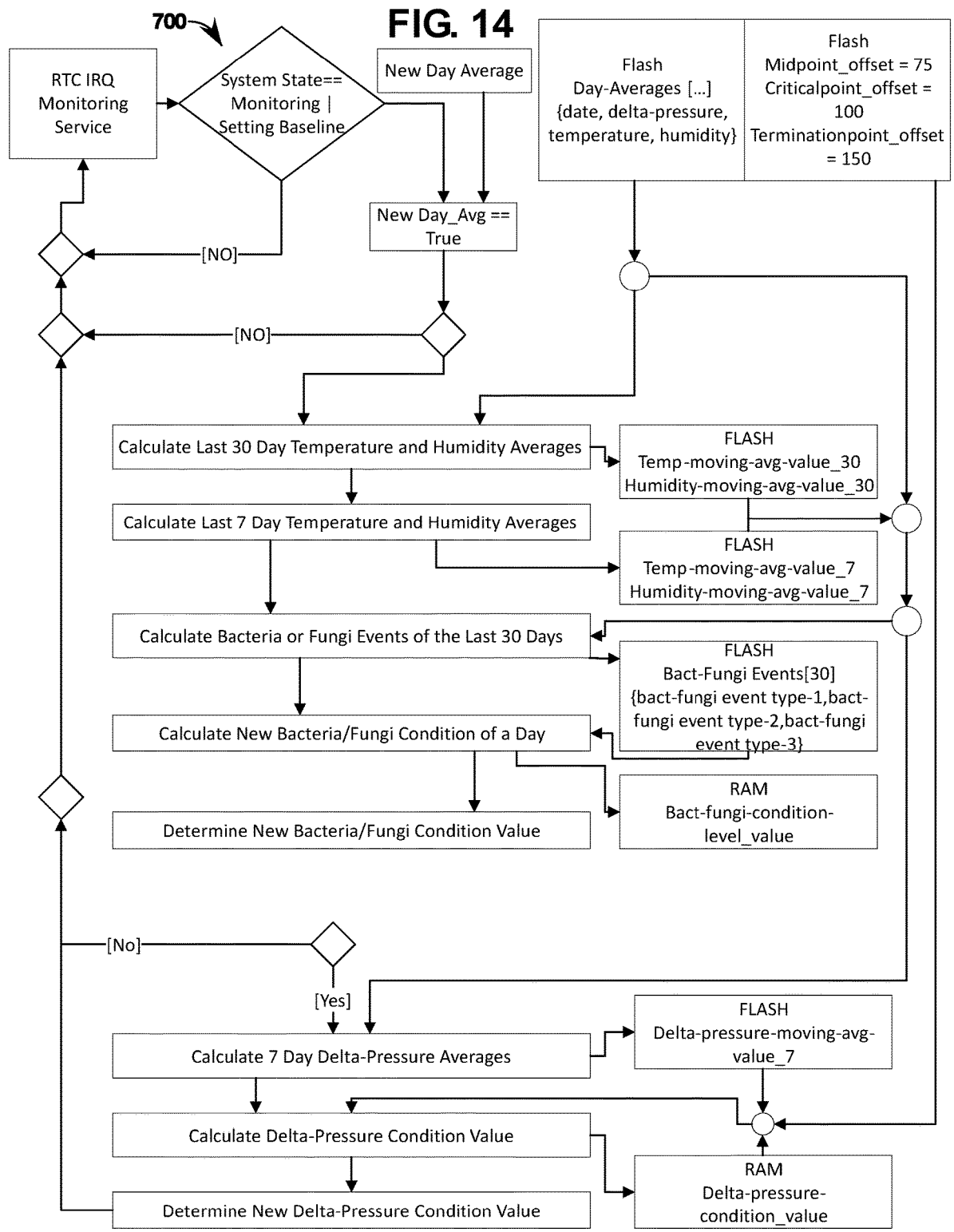
FIG. 14 illustrates an exemplary flow chart of various calculation and method steps associated with of a cabin air filter element monitoring and analysis system as contemplated herein.
Figure 15:
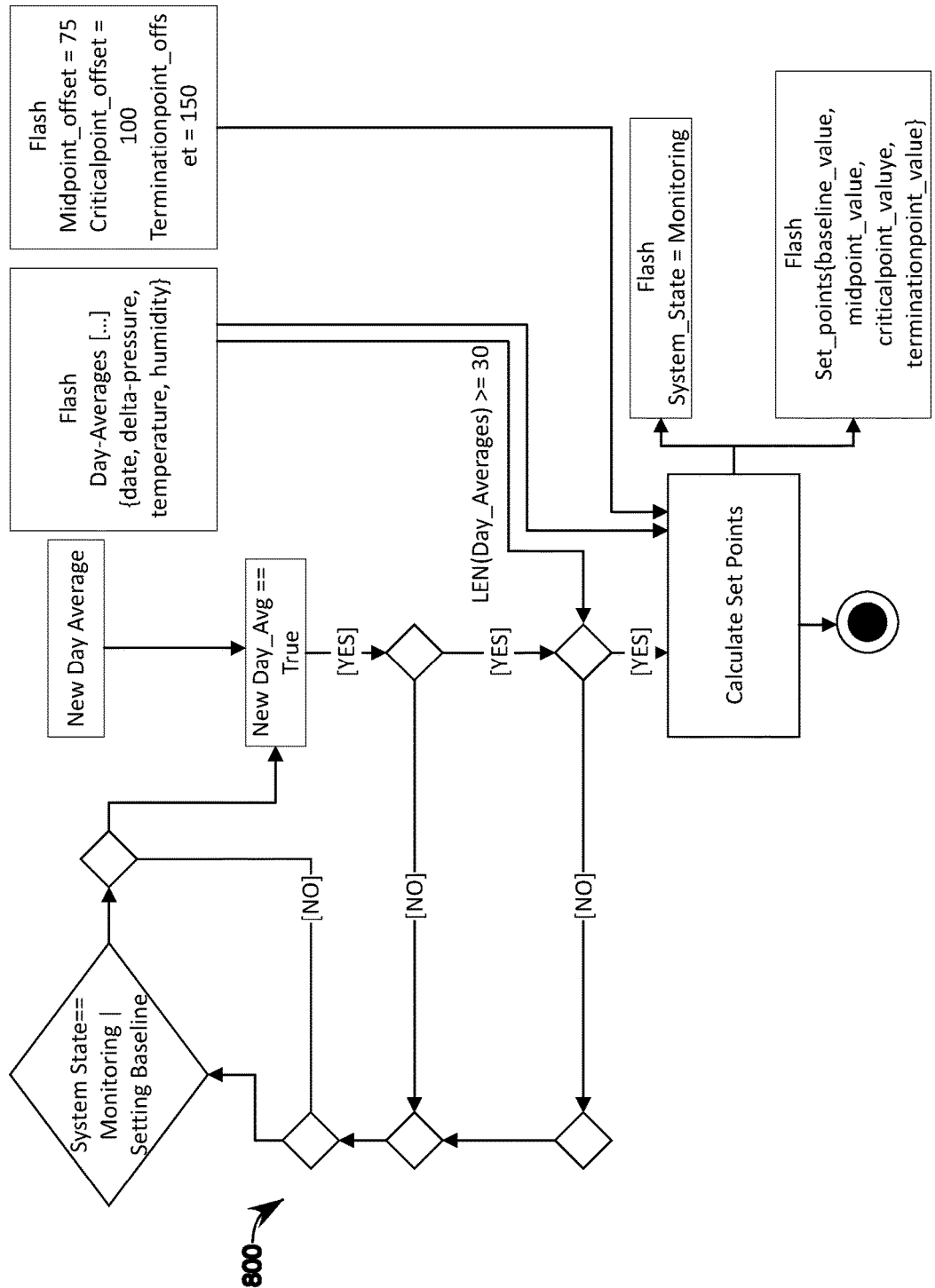
FIG. 15 illustrates another exemplary flow chart of various calculation and method steps associated with of a cabin air filter element monitoring and analysis system as contemplated herein.

It will be appreciated that the system can be configured to provide alerts under a wide variety of conditions. Flow diagrams 700 and 800 as depicted in FIGS. 14-15 illustrate many of the control operations of the system and determinations being made by the system with regard to filter element monitoring and the necessity of generating an alert therefore.

In some instances, the sensor data and comparison to the reference database can indicate a critical event, such as high humidity exposure coupled with an optimal temperature range for a prolonged period. Such an event can then be correlated with a high probability of microbial growth and trigger an alert from a single such occurrence.

In yet additional embodiments the system can track multiple exposure occurrences within a predetermined range and string the multiple exposure occurrences together to incrementally increase a calculated likelihood of microbial growth. Once the calculated growth likelihood or potential surpasses a predetermined threshold or a threshold number of occurrences an alert can be generated and provided to the user/operator.

In some embodiments, the system can make logistical determinations regarding microbial growth. For example, the system can track high humidity events and if a plurality of following readings would not have provided conditions which would result in suitable drying of the filter element in an appropriate timeframe such situations can be correlated to an increased growth potential and thus result or contribute to an alert generation threshold.

For example, events which contribute to generation of an alert might include
  Last 30-day average surface RH>80% & last 30-day average temperature between 5° C. and 40° C.
  Last 7-day average surface RH>98% & last 7-day average temperature between 5° C. and 40° C.
  Last 24-h average surface RH>100% & last 24-h running average temperature is between 5° C. and 40° C.
  "No microbial growth possible, Filter OK"
  No critical incident type 1, 2 & ≤5 critical incidents type 3 over the last 30 days
  "microbial growth possible, change filter now to prevent future unpleasant smell in your car":
  No critical incident type 1 & 6-15 critical incidents type 3 over the last 30 days
  Or
  No critical incident type 1 & ≤2 critical incidents type 2 over the last 30 days
  "High chance for microbial growth, change filter now"
  One critical incident type 1
  Or
  More than 2 critical incidents type 2 over the last 30 days
  Or
  More than 15 critical incident type 3 over the last 30 days In some embodiments, a detailed or comprehensive status report can be provided to the user or operator wherein a filter status, likely service interval, and a log of readings and compared values to a table within the reference database can be provided to the user.

In the various embodiments, sensors can include pressure sensors, accelerometers, flow sensors, strain sensors, humidity sensors, air-mass flow, temperature, particle counter, turbulence sensor, spectrometry, sound, vehicle operation parameters, and optical sensors.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, using short-wavelength UHF radio waves in the ISM band from 2.400 to 2.485 GHz from fixed and mobile devices, and building personal area networks also known as Bluetooth™, and the like without departing from the scope and intent of the present disclosure.

The filter element status can include detecting whether the filter element is worn, such as thinning in certain areas, blown-out, such as having a hole or enlargement of another aperture that allows the free flow of air, tearing of the filter element, and so forth. The particle load can include detecting a quantity of mass disposed on or in the filter element, or it can be a detection of a restriction of air flow through the filter element, the uniformity or lack thereof of air flow transmitting through the filter element, or even a detection of pressure drop below a certain threshold.

Additionally, microbials contemplated herein can include, but are not limited to, bacteria, viral growths, fungal growth, or any other microscopic organisms which may result in contaminants or odors.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

What is claimed:

1. A filter element status analysis and notification system, the system comprising:
   a primary control unit, the primary control unit including a first wireless communication mechanism, processing circuitry, and a non-transitory computer-readable medium, the non-transitory computer-readable medium containing one or more sets of computer instructions configured to instruct the processing circuitry to perform a plurality of tasks;
   a filter element configured to filter an airstream provided to a cabin of a vehicle;
   a sensor module provided on and contacting the filter element, the sensor module further comprising:
      a plurality of sensors, the sensors including at least a temperature sensor and at least one humidity sensor, each of the plurality of sensors configured to collect data regarding one or more associated filter element parameters; and
      a second wireless communication mechanism being configured to transmit each of the one or more associated filter parameters to the first communication mechanism of the primary control unit;
   wherein one or more sets of computer instructions include instructions for the processing circuitry to perform the following tasks:
      receive the one or more associated filter parameters from the sensor module;
      retrieve a reference database; the reference database containing information regarding temperature and humidity values corresponding to one or more ranges associated with an increased microbial growth potential;
      compare the one or more associated filter parameters from the sensor module to the one or more ranges associated with an increased microbial growth potential as provided in the reference database,
      determine whether any of the one or more associated filter parameters fall within a pre-determined alert range within the reference database;
      generate an alert when any of the one or more associated filter parameters fall within the pre-determined alert range, the pre-determined alert range relating to at least temperature and humidity levels corresponding to the ranges corresponding with increased mold growth potential; and
      broadcast the alert to a user of the vehicle;
   the system further comprising:
      a secondary control unit, the secondary control unit further including a display, the display being configured to display the alert;
   wherein the primary control unit is operatively connected to the secondary control unit utilizing wireless communication, and wherein the secondary control unit is configured to act as an intermediary and being configured so as to receive the associated filter parameters and forward the associated filter parameters to the primary control unit.

2. The system of claim 1, wherein
   the secondary control unit is a smart device, the smart device including
      a first wireless communication system, the first wireless communication system providing network connectivity between the smart device and the primary control unit, and
   wherein the secondary control unit also including
      a secondary wireless communication system, the second wireless communication system including short-range wireless connectivity, and
      wherein the second wireless communication mechanism of the sensor module also includes short-range wireless connectivity,
      wherein the secondary control unit and the sensor module communicate utilizing short-range wireless connectivity.

3. The system of claim 1, wherein
   the sensor module includes
      a local non-transitory computer-readable medium,
      wherein the sensor module is configured to take a plurality of sensor measurements relating to the one or more associated filter parameters for each of the plurality of sensors, and
      wherein the sensor module records the one or more sensor measurements and an associated measurement time and records each of the one or more sensor measurements on the local non-transitory computer-readable medium.

4. The system of claim 1, wherein
   the sensor module further comprises:
      one or more pressure sensors, the one or more pressure sensors configured to determine a pressure differential.

5. The system of claim 4, wherein
   the sensor module is configured to enter a power saving mode after a plurality of sequential zero differential pressure readings between the first pressure sensor and the second pressure sensor,
   wherein in power saving mode the sensor module is configured to take sensor readings at time intervals being preferably longer than sixty seconds.

6. The system of claim 1, wherein
the one or more sets of computer instructions include instructions for the processing circuitry to perform the following tasks:
generating a historical report showing the one or more associated filter parameters as recorded in a historical database; and
displaying the report to a user of the vehicle.

7. The system of claim 1, wherein
the sensor module includes
a local non-transitory computer-readable medium and local processing circuitry,
wherein the sensor module is configured to take a plurality of sensor measurements relating to the one or more associated filter parameters at intermittent periods and stores the
sensor measurements for a delayed and intermittent transmission to the primary control unit.

8. The system of claim 7, wherein
the sensor measurements are preferably taken at time intervals being at least sixty seconds apart.

9. The system of claim 7, wherein
the delayed and intermittent transmissions occur at time intervals being preferably at least sixty seconds apart.

10. The system of claim 9, wherein
between each of the delayed and intermittent transmissions the sensor module enters a power saving mode.

11. The system of claim 1, wherein
the primary control unit is a smart device, the smart device including
a first wireless communication system,
the first wireless communication system providing network connectivity,
wherein the smart device is configured to retrieve the reference database from a network location, the smart device also including
a second wireless communication system,
the second wireless communication system including short-range wireless connectivity, and
wherein the second wireless communication mechanism of the sensor module also includes short-range wireless connectivity,
wherein the primary control unit and the sensor module communicate utilizing short-range wireless connectivity.

12. The system of claim 1, wherein
the filter element includes
a filter media provided having a plurality of pleats,
wherein the sensor module is sized so as to fit between one of the plurality of pleats.

13. A filter element status analysis and notification system, the system comprising:
a primary control unit, the primary control unit including
a first wireless communication mechanism, processing circuitry, and a non-transitory computer-readable medium, the non-transitory computer-readable medium containing one or more sets of computer instructions configured to instruct the processing circuitry to perform a plurality of tasks;
a filter element configured to filter an airstream provided to a cabin of a vehicle;
a sensor module having a sensor module housing arranged on and contacting the filter element, the sensor module further comprising:
a plurality of sensors including at least a temperature sensor and at least one humidity sensor, each of the plurality of sensors configured to collect data regarding one or more associated filter element parameters;
one or more pressure sensors, the one or more pressure sensors configured to determine a pressure differential; and
a second wireless communication mechanism being configured to transmit each of the one or more associated filter parameters to the first communication mechanism of the primary control unit;
wherein the one or more sets of computer instructions include instructions for the processing circuitry to perform the following tasks:
receive the one or more associated filter parameters from the sensor module;
retrieve information, from a reference database; the information regarding temperature and humidity values corresponding to one or more ranges associated with an increased microbial growth potential;
compare the one or more associated filter parameters from the sensor module to the one or more ranges associated with an increased microbial growth potential as provided in the reference database,
determine whether any of the one or more associated filter parameters fall within a pre-determined alert range within the reference database;
generate an alert when any of the one or more associated filter parameters fall within the pre-determined alert range, the pre-determined alert range relating to at least temperature and humidity levels corresponding to the ranges corresponding with increased mold growth potential; and
broadcast the alert to a user of the vehicle;
wherein the filter element includes a filter media having a plurality of pleats;
wherein the sensor module housing is embedded within the pleats of the filter media, the sensor module housing including a channel formed as a projection on the sensor module housing, the channel projecting through the filter element from a first side of the filter element to a second side of the filter element;
wherein the one or more pressure sensors include:
a first pressure sensor reading an ambient pressure on the first side of the filter element;
a second pressure sensor reading a second ambient pressure on the second side of the filter element through the channel projecting through the filter element, so as to determine a pressure differential across the filter element.

14. A method of analyzing a filter element status and providing alerts of said status, the method comprising the steps of:
providing a filter element configured to filter an airstream circulated within a cabin of a vehicle;
providing a sensor module arranged on and contacting the filter element, the sensor module further comprising:
a plurality of sensors, the sensors including
at least a temperature sensor and
at least one humidity sensor,
each of the plurality of sensors configured to collect data regarding one
or more associated filter element parameters; and
a local wireless communication mechanism being configured to transmit each of the one or more associated filter parameters;
providing a primary control unit, the primary control unit including a first wireless communication mechanism, processing circuitry, and a non-transitory computer-readable medium,
the non-transitory computer-readable medium containing one or more sets of computer instructions;
receiving the one or more associated filter parameters from the sensor module;
retrieving a reference database, the reference database containing information regarding temperature and humidity values corresponding to the ranges with increased microbial growth potential;
comparing the one or more associated filter parameters from the sensor module to the reference database;
determining whether any of the one or more associated filter parameters
fall within a pre-determined alert range within the reference database;
generating an alert when any of the one or more associated filter parameters fall within the pre-determined alert range, the pre-determined alert range relating to at least temperature and humidity levels corresponding to the ranges corresponding with increased mold growth potential; and
broadcasting the alert to a user of the vehicle;
providing a secondary control unit, the secondary control unit further including
a display, the display being configured to receive the alert from the primary control unit and display the alert;
wherein the primary control unit is operatively connected to the secondary control unit utilizing wireless communication, and
wherein the secondary control unit is configured to act as an intermediary and being configured so as to receive the associated filter parameters and forward the associated filter parameters to the primary control unit.

15. The method of claim 14, wherein
the secondary control unit is a smart device, the smart device including
a first wireless communication system,
the first wireless communication system providing network connectivity between the smart device and the primary control unit, and
wherein the secondary control unit also including
a secondary wireless communication system,
the second wireless communication system including short-range wireless connectivity, and
wherein the second wireless communication mechanism of the sensor module also includes short-range wireless connectivity,
wherein the secondary control unit and the sensor module communicate utilizing short-range wireless connectivity.

16. The method of claim 14, wherein
the sensor module includes a local non-transitory computer-readable medium,
wherein the sensor module is configured to take a plurality of sensor measurements relating to the one or more associated filter parameters for each of the plurality of sensors, and
wherein the sensor module records the one or more sensor measurements and an associated measurement time and records each of the one or more sensor measurements on the local non-transitory computer-readable medium.

17. The method of claim 14, wherein the method further comprises:
providing one or more pressure sensors to the sensor module;
determining a pressure differential utilizing the one or more pressure sensors.

18. The method of claim 17, wherein the method further comprises:
providing a housing, the housing including a channel, the channel being configured to extend from the housing being located on an inlet side of the filter element, the channel extending through the filter element to an outlet side.

19. The method of claim 17, wherein
the sensor module is configured to enter a power saving mode after a plurality of sequential zero differential pressure readings between the first pressure sensor and the second pressure sensor,
wherein in power saving mode the sensor module is configured to take sensor readings at intervals being longer than sixty seconds.

20. The method of claim 14, wherein the one or more sets of computer instructions include instructions for the processing circuitry to perform the following tasks:
generating a historical report showing the one or more associated filter parameters as recorded in a historical database; and
displaying the report to a user of the vehicle.

21. The method of claim 14, wherein the sensor module includes
a local non-transitory computer-readable medium and local processing circuitry,
wherein the sensor module is configured to take a plurality of sensor measurements relating to
the one or more associated filter parameters at intermittent periods and stores the sensor measurements for a delayed and intermittent transmission to the primary control unit.

22. The method of claim 21, wherein
the sensor measurements are taken at time intervals being at least sixty seconds apart.

23. The method of claim 21, wherein
the delayed and intermittent transmissions occur at time intervals being at least sixty seconds apart.

24. The method of claim 23, wherein
between each of the delayed and intermittent transmissions the sensor module enters a power saving mode.

25. The method of claim 14, wherein
the primary control unit is a smart device, the smart device including
a first wireless communication system, the first wireless communication system providing network connectivity,
wherein the smart device is configured to retrieve the reference database from a network location, the smart device also including
a second wireless communication system, the second wireless communication system including short-range wireless connectivity, and
wherein the second wireless communication mechanism of the sensor module also includes short-range wireless connectivity,
wherein the primary control unit and the sensor module communicate utilizing short-range wireless connectivity.

26. The method of claim 14, wherein
the filter element includes a filter media provided having a plurality of pleats, and
wherein the method includes a step of securing the sensor module between one of the plurality of pleats, wherein the sensor module is sized so as to fit between one of the plurality of pleats.

* * * * *